United States Patent
Ishibashi

(10) Patent No.: US 10,469,741 B2
(45) Date of Patent: Nov. 5, 2019

(54) IMAGE PROCESSING APPARATUS AND IMAGE PROCESSING METHOD

(71) Applicant: CANON KABUSHIKI KAISHA, Tokyo (JP)

(72) Inventor: Tohru Ishibashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/051,154

(22) Filed: Jul. 31, 2018

(65) Prior Publication Data

US 2019/0045114 A1    Feb. 7, 2019

(30) Foreign Application Priority Data

Aug. 7, 2017    (JP) .................................. 2017-152410

(51) Int. Cl.
| | |
|---|---|
| H04N 5/232 | (2006.01) |
| H04N 5/225 | (2006.01) |
| H04N 5/235 | (2006.01) |
| G03B 17/14 | (2006.01) |
| G03B 37/02 | (2006.01) |

(52) U.S. Cl.
CPC ......... *H04N 5/23229* (2013.01); *G03B 17/14* (2013.01); *G03B 37/02* (2013.01); *H04N 5/2254* (2013.01); *H04N 5/2353* (2013.01); *H04N 5/23267* (2013.01)

(58) Field of Classification Search
CPC ...... G03B 17/14; G03B 37/02; H04N 5/2254; H04N 5/23229; H04N 5/23267; H04N 5/2353
See application file for complete search history.

(56) References Cited

U.S. PATENT DOCUMENTS

| | | | |
|---|---|---|---|
| 9,240,077 B1* | 1/2016 | Kraft | ..................... G06T 19/006 |
| 2015/0042840 A1* | 2/2015 | Komatsu | ............ H04N 5/23229 |
| | | | 348/222.1 |
| 2016/0358355 A1* | 12/2016 | Lin | ..................... G06K 9/4638 |

(Continued)

FOREIGN PATENT DOCUMENTS

| | | |
|---|---|---|
| JP | H11-331696 A | 11/1999 |
| JP | 2005-328497 A | 11/2005 |
| JP | 2011-188340 A | 9/2011 |

*Primary Examiner* — Chiawei Chen
(74) *Attorney, Agent, or Firm* — Canon U.S.A., Inc. IP Division

(57) ABSTRACT

A image signal processing circuit acquires a plurality of images captured while an image capturing direction is sequentially changed. A microcomputer calculates the amount of movement along image capturing direction at the time when the plurality of images is sequentially captured, and calculates a projective transformation coefficient for each of the plurality of images based on a posture of an image capturing apparatus at the time when each of the plurality of images is captured. Then, the image signal processing circuit performs a projective transformation using the coefficient to correct trapezoidal distortions in the images, and, performs alignment between the images of neighboring image capturing direction after the projective transformation is performed, based on the amount of movement, and combines the images on which the alignment has been performed by joining the images together in the order in which the image capturing direction is changed.

21 Claims, 9 Drawing Sheets

(56) References Cited

U.S. PATENT DOCUMENTS

| | | | |
|---|---|---|---|
| 2017/0078577 A1* | 3/2017 | Wakamatsu | H04N 5/23287 |
| 2018/0182075 A1* | 6/2018 | Sasaki | G06T 5/007 |
| 2018/0213153 A1* | 7/2018 | Iso | H04N 5/23229 |
| 2018/0220071 A1* | 8/2018 | Oshima | H04N 5/2624 |
| 2018/0324396 A1* | 11/2018 | Ishikawa | G03B 21/00 |
| 2019/0087962 A1* | 3/2019 | Hayashi | G06T 7/11 |

* cited by examiner

FIRST PAGE

SECOND PAGE

IMAGE PROCESSING APPARATUS AND IMAGE PROCESSING METHOD

BACKGROUND OF THE INVENTION

Field of the Invention

The present invention relates to an image processing apparatus configured to process images and an image processing method.

Description of the Related Art

In recent years, techniques of generating a panoramic image by joining together a plurality of images captured while the image capturing direction of an image capturing apparatus is sequentially changed in a certain direction (e.g., horizontal direction, vertical direction) are known. For example, Japanese Patent Application Laid-Open No. 2005-328497 discusses a technique of generating a panoramic image in which predetermined-size image regions are cut out in such a manner that the image regions overlap each other at overlapping portions from images captured while the image capturing direction is sequentially changed, and then the cut out images are sequentially joined together while the overlapping portions of the image regions are superimposed.

Further, when performing panoramic image capturing, a user (person capturing images) is likely to stand vertically on the ground and rotate about himself/herself as the rotation center while holding an image capturing apparatus. For example, Japanese Patent Application Laid-Open No. 11-331696 discusses a technique of generating a panoramic image by conducting cylindrical mapping transformation onto a virtual cylindrical surface having an image capturing focal length as its radius on images captured while the image capturing direction of an image capturing apparatus is moved (rotated) about a rotation axis in the horizontal direction and then joining the transformed images together.

Further, Japanese Patent Application Laid-Open No. 2011-188340 discusses a technique, although it is different from a technique of generating a panoramic image, in which the angle with respect to the gravity direction at which an image capturing apparatus is held and the movement of the image capturing apparatus are detected, and in a case where the image capturing apparatus is moved, distortion correction is performed to display images as if the images are captured with the image capturing apparatus facing a substantially horizontal direction. Specifically, in the discussed technique, a portion in an image capturing range that corresponds to the substantially horizontal direction (e.g., the boundary between the road surface and the sky) is detected and the slope (distortion) of the image of the portion that corresponds to the substantially horizontal direction is corrected to display a live view image as if it is captured by the image capturing apparatus facing the substantially horizontal direction.

Meanwhile, in panoramic image capturing, when a plurality of images is captured while the image capturing direction of an image capturing apparatus is sequentially changed, for example, in a horizontal direction, the images can be captured by the image capturing apparatus in a tilted-posture state (e.g., the state in which the optical axis is tilted upward or downward with respect to the horizontal direction). If, for example, the horizontal direction of the ground is set as a reference direction and the image capturing apparatus being in the state in which the optical axis is tilted upward or downward with respect to the reference direction captures images of a rectangular building, etc. standing vertically with respect to the reference direction, the captured images of the rectangular building, etc. which are distorted, are acquired. In this case, if image regions each containing the building, etc. are cut out from the images acquired by panoramic image capturing and the cutout image regions are joined together, a low-quality panoramic image is generated in which the building is curved and/or the joints are misaligned. This also occurs in the technique discussed in Japanese Patent Application Laid-Open No. 11-331696.

The technique discussed in Japanese Patent Application Laid-Open No. 2011-188340 is capable of correcting an image of a building distorted trapezoidally to an image of the building in the shape of a rectangle and then displaying the corrected image. The technique discussed in Japanese Patent Application Laid-Open No. 2011-188340, however, intends to correct slope of images of portions corresponding to a substantially horizontal direction and detected in an image capturing range in the direction in which the user is moving, e.g., walking, and to display a live view image as if the image is captured by an image capturing apparatus facing the substantially horizontal direction. Thus, in such cases in which a user rotates about himself/herself to capture images while changing the image capturing direction of an image capturing apparatus in the horizontal direction and then the captured images are combined together as in panoramic image capturing, application of the technique discussed in Japanese Patent Application Laid-Open No. 2011-188340 is less likely to generate high-quality panoramic images.

SUMMARY OF THE INVENTION

Embodiments of the present invention are directed to a technique capable of generating high-quality panoramic images even in the case where an image capturing apparatus in a tilted-posture state captures images in panoramic image capturing.

According to embodiments of the present invention, an image processing apparatus includes at least one memory configured to store instructions and at least one processor connected to the at least one memory and configured to execute the instructions to calculate an amount of movement along an image capturing direction where neighboring images captured adjoin while the image capturing direction is sequentially changed, calculate a coefficient of a projective transformation with respect to the each image based on information about a posture of an image capturing apparatus when the image is captured, perform the projective transformation on the each image using the coefficient calculated based on the information about the posture to correct a trapezoidal distortion that occurs in the each image, perform alignment, based on the amount of movement, along the image capturing direction after the projective transformation is performed; and combine the images on which the alignment has been performed by joining the images together in an order in which the image capturing direction is changed.

Further features of the present invention will become apparent from the following description of exemplary embodiments with reference to the attached drawings.

DESCRIPTION OF THE EMBODIMENTS

Several exemplary embodiments of the present invention will be described in detail below with reference to the drawings.

First Embodiment

Figure 1:
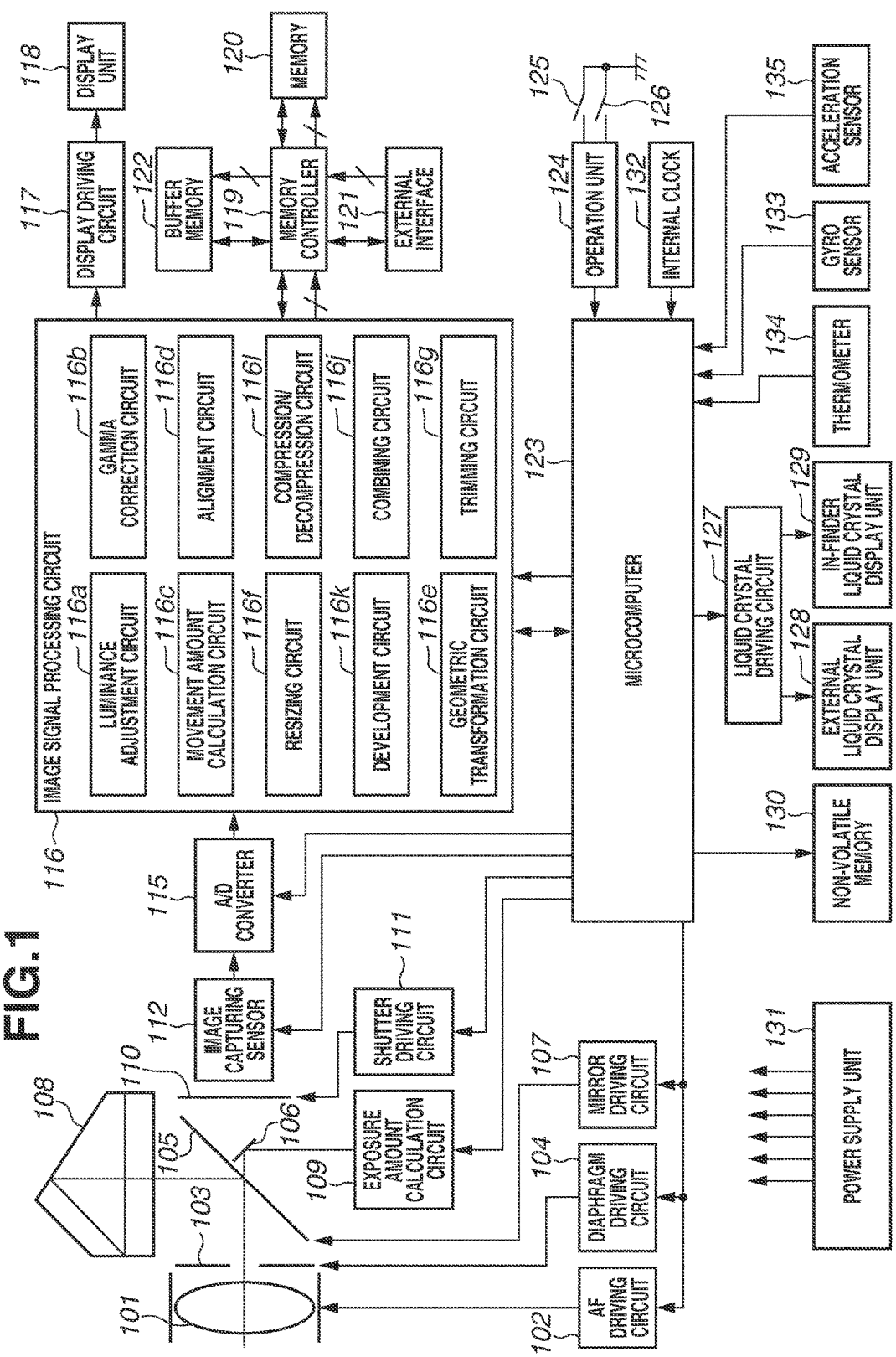
FIG. 1 schematically illustrates the configuration of an image capturing apparatus according to an exemplary embodiment of the present invention.

FIG. 1 is a block diagram schematically illustrating an example of the configuration of an image capturing apparatus (e.g., digital camera) as an example of an application of an image processing apparatus according to a first exemplary embodiment.

In FIG. 1, an image capturing lens 101 includes a focus lens and a zoom lens and forms an optical image of a subject, etc. onto an image capturing surface of an image capturing sensor 112. The image capturing lens 101 can be an interchangeable lens which is attachable to and removable from the body of the image capturing apparatus or can be a lens fixed to the image capturing apparatus. An aperture 103 is driven by an aperture driving circuit 104 to adjust the amount of incident light through the image capturing lens 101. The aperture driving circuit 104 changes the optical aperture value at the aperture 103 based on the aperture driving amount calculated by a microcomputer 123. An auto-focus (AF) driving circuit 102 includes, for example, a direct-current (DC) motor and a stepping motor and drives the focus lens of the image capturing lens 101 based on focus control signals from the microcomputer 123 to adjust the focus.

A main mirror 105 is a mirror configured to switch an incident light beam from the image capturing lens 101 between the finder unit side and the image capturing sensor 112 side. The main mirror 105 is normally disposed to reflect a light beam to the finder unit side, but in a case of performing image capturing or displaying a live view, the main mirror 105 is raised upward so that the light beam from the image capturing lens 101 enters the image capturing sensor 112. The mirror driving such as the raising of the main mirror 105 upward is performed by a mirror driving circuit 107 under the control by the microcomputer 123. Further, the main mirror 105 is a half mirror, and at its central portion transmits a part of light.

A pentaprism 108 constitutes a part of the finder unit and is a prism configured to guide to an eyepiece portion (not illustrated) an incident light beam that is reflected by the main mirror 105 from the image capturing lens 101. The eyepiece portion (not illustrated) includes a focusing plate (not illustrated) and an eyepiece lens (not illustrated).

A sub-mirror 106 is a mirror configured to reflect a light beam transmitted through the half mirror provided at the central portion of the main mirror 105 and guide the reflected light beam to a focus detection sensor (not illustrated) or an exposure amount detection sensor (not illustrated) provided together with an exposure amount calculation circuit 109.

The exposure amount detection sensor photoelectrically converts the incident light, which is transmitted through the half mirror at the central portion of the main mirror 105 and reflected by the sub-mirror 106, and transmits the electrically converted light to the exposure amount calculation circuit 109. The exposure amount calculation circuit 109 calculates an exposure amount based on the detection output from the exposure amount detection sensor and outputs a signal of the calculated exposure amount to the microcomputer 123. The microcomputer 123 controls the aperture driving amount, shutter speed, exposure time, etc. based on the signal of the exposure amount.

The focus detection sensor receives the light beam, which is transmitted through the half mirror at the central portion of the main mirror 105 and reflected by the sub-mirror 106, and transmits the sensor output to the microcomputer 123. The microcomputer 123 calculates a defocus amount based on the sensor output, performs focus calculation based on the defocus amount to generate a focus control signal, and controls the AF driving circuit 102 based on the focus control signal.

A focal plane shutter 110 (hereinafter, "the shutter 110") is driven by a shutter driving circuit 111 under the control by the microcomputer 123. Namely, the opening time of the shutter 110 is controlled by the microcomputer 123.

The image capturing sensor 112 is a charge-coupled device (CCD) sensor, or a complementary metal oxide semiconductor (CMOS) sensor, etc. on which the microcomputer 123 performs driving control, and the image capturing sensor 112 converts a subject image formed by the image capturing lens 101 into an electric signal. An analog/digital (A/D) converter 115 converts analog output signals from the image capturing sensor 112 into digital signals under the control by the microcomputer 123. The digital signals output from the A/D converter 115 are transmitted to an image signal processing circuit 116.

The image signal processing circuit 116 performs filter processing, color conversion processing, gamma correction, etc. and also performs compression processing into Joint Photographic Experts Group (JPEG) data, etc. on the digitalized image data, and outputs the processed data to a memory controller 119. At this time, the image signal processing circuit 116 can control a buffer memory 122 to store image data being processed temporarily via the memory controller 119. Further, the image signal processing circuit 116 can output image data captured by the image capturing sensor 112 and image data input from the memory controller 119 to a display unit 118 via a display driving circuit 117. The foregoing functions at the image signal processing circuit 116 are switched according to instructions from the microcomputer 123. Further, the image signal processing circuit 116 can output exposure information and information such as white balance in the image capturing by the image capturing sensor 112 to the microcomputer 123, when it is needed. Based on the foregoing information, the microcomputer 123 gives instructions regarding white balance and gain adjustment.

Further, when a consecutive image capturing operation such as panoramic image capturing is performed, the image signal processing circuit 116 temporarily controls the buffer memory 122 to store captured unprocessed image data via the memory controller 119 and then reads the stored data to perform image processing and compression processing on the read data. The storing in the buffer memory 122, the image processing, and the compression processing are performed continuously while the consecutive image capturing operation such as panoramic image capturing is performed. The number of images that can be captured consecutively is determined according to the capacity of the buffer memory 122 and the size of images captured in panoramic image capturing.

The image signal processing circuit 116 is realized by a logic device such as a gate array and includes a luminance adjustment circuit 116a, a gamma correction circuit 116b, a development circuit 116k, and a compression/decompression circuit 116l. Further, the image signal processing circuit 116 also includes a movement amount calculation circuit 116c, an alignment circuit 116d, a geometric transformation circuit 116e, a resizing circuit 116f, a trimming circuit 116g, and a combining circuit 116j. The development circuit 116k performs development processing. The luminance adjustment circuit 116a adjusts the brightness based on the digital gain. The gamma correction circuit 116b adjusts the luminance based on the gamma characteristics. The compression/decompression circuit 116l performs conversion into a commonly-used image format such as JPEG format. The movement amount calculation circuit 116c calculates a movement amount from a plurality of images to calculate a shake amount. The alignment circuit 116d performs alignment considering the shake amount. The geometric transformation circuit 116e performs distortion/aberration correction on the image capturing lens 101 described below, affine transformation, projective transformation, cylindrical coordinate transformation, truncated cone coordinate transformation, etc. The resizing circuit 116f resizes the size of an image. The trimming circuit 116g cuts out a portion of an image. The combining circuit 116j combines a plurality of images together. The operations of the movement amount calculation circuit 116c, the alignment circuit 116d, the geometric transformation circuit 116e, the resizing circuit 116f, the trimming circuit 116g, and the combining circuit 116j during panoramic image capturing performed by the image capturing apparatus of the present exemplary embodiment will be described later.

The memory controller 119 controls the writing and reading of data to and from a memory 120, the temporary storing of data in the buffer memory 122, etc. The memory 120 can be a removable card-type memory. The memory controller 119 controls the buffer memory 122 to store unprocessed image data that is not processed by the image signal processing circuit 116 and to store in the memory 120 digital image data that is already processed by the image signal processing circuit 116. Further, the memory controller 119 outputs image data read from the buffer memory 122 or the memory 120 to the image signal processing circuit 116. Further, the memory controller 119 is also capable of outputting images stored in the memory 120 to an external device such as a computer via an external interface 121.

The display unit 118 is a display device such as a thin-film transistor (TFT) display or an organic electroluminescence (EL) display. The display driving circuit 117 receives display data stored in the buffer memory 122, which is also used as a video random access memory (VRAM), via the memory controller 119 and the image signal processing circuit 116 and drives the display unit 118 to display an image, etc. on a screen based on the display data.

An operation unit 124 is connected to various buttons and switches and detects the states of the buttons and the switches and transmits signals of the detected states to the microcomputer 123. The microcomputer 123 controls the components based on the signals of the detected states from the operation unit 124.

Among the various switches connected to the operation unit 124, a switch 125 (hereinafter, "SW1") and a switch 126 (hereinafter, "SW2") are switches that are turned on or off by operating a release button. The state in which only the SW1 is on is a release button half-pressed state. During the release button half-pressed state, the microcomputer 123 starts an auto-focus operation of the image capturing apparatus and also starts a photometry operation. The state in which the SW1 and the SW2 are both on is a release button fully-pressed state. During the release button fully-pressed state, the microcomputer 123 causes the image capturing apparatus to perform image capturing and recording. Further, while the release button fully-pressed state is continued, the microcomputer 123 causes the image capturing apparatus to perform a consecutive image capturing operation.

Further, examples of the buttons (not illustrated) and the switches (not illustrated) connected to the operation unit 124 further include an exposure correction button, an aperture button, an International Organization for Standardization (ISO) sensitivity setting button, a menu button, a set button, a flash setting button, and a single-image-capturing/continuous-image-capturing/self-timer selection button. Further, examples of the buttons (not illustrated) connected to the operation unit 124 include a movement + (plus) button and a movement − (minus) button for moving a menu or a reproduced image, a display image enlargement button, a display image reduction button, a reproduction switch, a delete button, and an information display button. The aperture button is a button that is operated to narrow the aperture 103 to a preset aperture value. The delete button is a button that is operated to delete a captured image. The information display button is a button that is operated to display information about image capturing or reproduction. Further, for example, a rotation dial can be connected to the operation unit 124. For example, the rotation dial can bear the functions of the movement + (plus) button and the movement − (minus) button. A numerical value or function can be selected more easily by rotating the rotation dial A liquid crystal driving circuit 127 drives an external liquid crystal display unit 128 and an in-finder liquid crystal display unit 129. The microcomputer 123 transmits the displayed contents to the liquid crystal driving circuit 127, and the liquid crystal driving circuit 127 drives the external liquid crystal display unit 128 and the in-finder liquid crystal display unit 129 to display the operation state of the image capturing apparatus, messages, etc. using characters and images. Further, the in-finder liquid crystal display unit 129 is provided with a backlight (not illustrated) such as a light-emitting diode (LED), and the LED is also driven by the liquid crystal driving circuit 127.

The microcomputer 123 confirms the capacity of the memory 120 via the memory controller 119 and then can calculate the remaining number of images can be captured based on image size predicted value data according to the ISO sensitivity, image size, and image quality which are set prior to image capturing. Then, the microcomputer 123 displays the remaining number of images can be captured on the display unit 118. Further, the microcomputer 123 can display as needed the remaining number of images can be captured on the external liquid crystal display unit 128 and the in-finder liquid crystal display unit 129.

A non-volatile memory 130 is an electrically erasable programmable read-only memory (EEPROM) and retains stored contents even during a state in which no power supply is connected to the image capturing apparatus. An operation program of the microcomputer 123 is stored in the non-volatile memory 130. In a case where the image processing on images acquired by panoramic image capturing is realized by a software configuration, an image processing program according to the present exemplary embodiment is also stored in the non-volatile memory 130, and the microcomputer 123 executes the image processing program.

A gyro sensor 133 is, for example, a two- or three-axis gyro sensor which detects the angular velocity of rotation of the image capturing apparatus and outputs the detection signals to the microcomputer 123.

An acceleration sensor 135 is, for example, a three-axis acceleration sensor which detects the posture of the image capturing apparatus and outputs the posture detection signal to the microcomputer 123.

A thermometer 134 detects the temperature and outputs the detection signal to the microcomputer 123.

The external interface 121 connects the image capturing apparatus of the present exemplary embodiment to an external device such as a computer.

A power supply unit 131 includes, for example, a removable battery and supplies necessary power to the components of the image capturing apparatus of the present exemplary embodiment.

An internal clock 132 outputs time-point information and time-period information needed for the operations of the image capturing apparatus to the microcomputer 123. The microcomputer 123 can, for example, add or superimpose image capturing time-point data based on the time-point information from the internal clock 132 to or on an image file recorded in the memory 120.

A regular image capturing operation in the image capturing apparatus of the present exemplary embodiment will be described below with reference to a flowchart in FIG. 2. The microcomputer 123 controls the components of the image capturing apparatus to perform the image capturing operation illustrated in the flowchart in FIG. 2. Before the image capturing operation is started, an exposure amount is calculated in advance by the exposure amount calculation circuit 109, and the aperture amount, accumulation period (shutter speed), ISO sensitivity, etc. are determined in advance.

Figure 2:
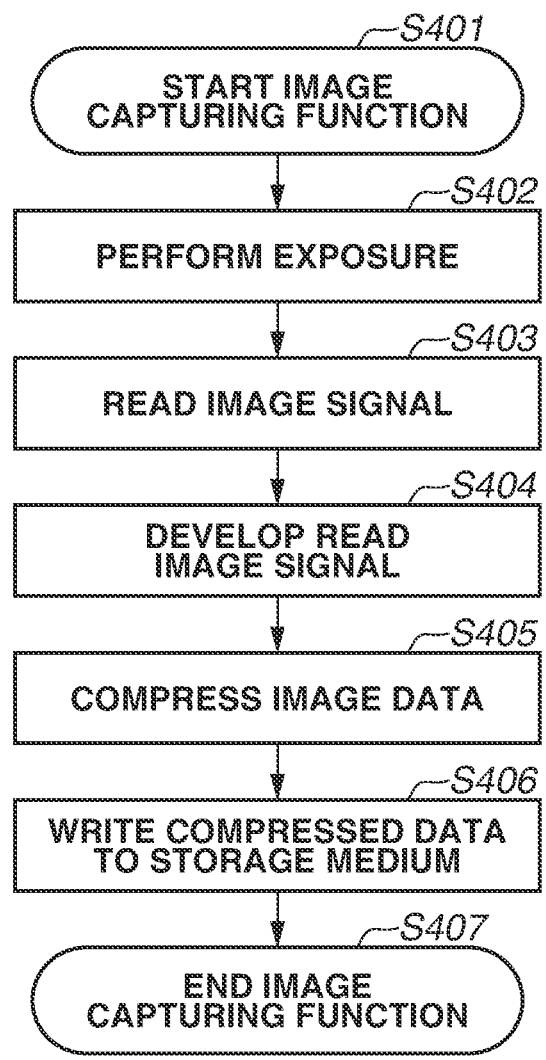
FIG. 2 is a flowchart illustrating a flow of regular image capturing operations.

If a user fully presses the release button and the SW1 and the SW2 are both changed to the on state, then in step S401, the microcomputer 123 starts controlling the image capturing operation illustrated in the flowchart in FIG. 2.

If the control of the image capturing operation is started, then in step S402, the microcomputer 123 controls the components to perform the following series of operations. First, the microcomputer 123 notifies the aperture driving circuit 104 of a predetermined aperture amount to adjust the aperture 103 to a target aperture amount. Further, the microcomputer 123 performs preparation for image capturing to change the image capturing sensor 112, the A/D converter 115, etc. to an operable state. Then, if the preparation for image capturing is completed, the microcomputer 123 controls the mirror driving circuit 107 to raise the main mirror 105 upward and also controls the shutter driving circuit 111 to open a leading curtain (not illustrated) of the shutter 110. In this way, a subject image via the image capturing lens 101 is formed on the image capturing sensor 112. Then, the microcomputer 123 controls the shutter driving circuit 111 to close a trailing curtain (not illustrated) of the shutter 110 after the preset accumulation period. In this way, light enters the image capturing sensor 112 only during the accumulation period. In step S402, the foregoing series of operations are performed to expose the image capturing sensor 112.

Then, in step S403, the microcomputer 123 control the buffer memory 122 to store image data output from the image capturing sensor 112 and converted at the A/D converter 115 via the image signal processing circuit 116 and also via the memory controller 119. In step S404, the microcomputer 123 transmits to the image signal processing circuit 116 the image data read from the buffer memory 122 via the memory controller 119 and causes the development circuit 116*k* to perform development processing. Alternatively, in step S404, the microcomputer 123 can control the image signal processing circuit 116 to perform image processing such as white balance processing and processing to apply a gain to a dark portion at the gamma correction circuit 116*b*.

Next, in step S405, the image signal processing circuit 116 converts the image data having undergone the image processing into a generally-used data format such as JPEG at the compression/decompression circuit 116*l* and records the converted image data in the memory 120 under the control by the microcomputer 123. Thereafter, if the release button is not in the fully-pressed state, then in step S407, the microcomputer 123 ends controlling the image capturing operation illustrated in the flowchart in FIG. 2.

The image data to be recorded in the memory 120 can be data that is acquired by performing lossless compression at the compression/decompression circuit 116*l* on raw data that has not undergone image processing or development processing at the image signal processing circuit 116. The microcomputer 123 determines whether to record the image data in a format such as JPEG or as the lossless compression raw data in the memory 120 based on user instructions via the operation unit 124.

Next, operations in panoramic image capturing that are performed in the case where an entire view of an image capturing target is wider than the image capturing angle of view of the image capturing apparatus and the combining processing performed to combine panoramic images in the image capturing apparatus of the present exemplary embodiment will be described below.

The panoramic image capturing becomes executable by a user setting an image capturing mode of the image capturing apparatus to a panoramic image capturing mode. In panoramic image capturing, a plurality of images each constituting a part of the entire view is sequentially captured while the image capturing direction of the image capturing apparatus is sequentially changed in a certain direction (e.g., horizontal direction, vertical direction). Further, when images are captured in panoramic image capturing, the images are captured such that portions of the same subject or the like within the angles of view (neighboring image capturing directions) that are neighboring along the certain direction in which the image capturing direction is sequentially changed overlap (are shared). In this way, the images captured by panoramic image capturing that are neighboring in the certain direction in which the image capturing direction is sequentially changed contain an overlapping (shared) image region. The certain direction in which the image capturing direction of the image capturing apparatus is sequentially changed in panoramic image capturing is generally set to the horizontal direction parallel to the ground, etc., but there are cases where the certain direction is set to the gravity direction (vertical direction). In the following description, the panoramic image capturing mode in the case where the image capturing direction is set to the generally-set horizontal direction will be described as an example.

Then, in panoramic image generation processing, feature points are extracted from the overlapping regions of the images, and motion vectors are detected based on how much the feature points have moved. Further, for example, an affine transformation coefficient is calculated from the motion vectors to perform affine transformation, and two images are superimposed such that the feature points in the overlapping regions correspond, whereby an image in which image regions other than the overlapping regions are joined together in the horizontal direction is generated. A panoramic image is generated by sequentially repeating the foregoing processing on the images that are neighboring in the horizontal direction.

Figure 3A:
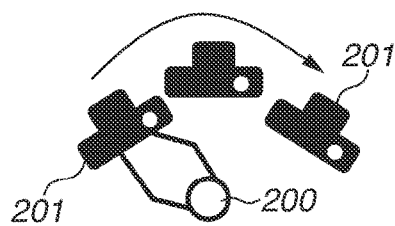
FIGS. 3A, 3B, 3C, 3D, 3E, and 3F are diagrams illustrating a relationship between an optical axis and a rotation axis during panoramic image capturing.

Further, in the case where the image capturing direction is sequentially changed in the horizontal direction in panoramic image capturing, a user 200 holding an image capturing apparatus 201 as illustrated in FIG. 3A (or in the state where the image capturing apparatus 201 is placed on an automatic platform, etc.), for example, performs an operation to rotate about the user 200 (or the automatic platform) as a rotation center. Hereinafter, the rotation where the user (or the automatic platform) is treated as the rotation center to sequentially change the image capturing direction of the image capturing apparatus 201 will be referred to as "swing".

Figure 4:
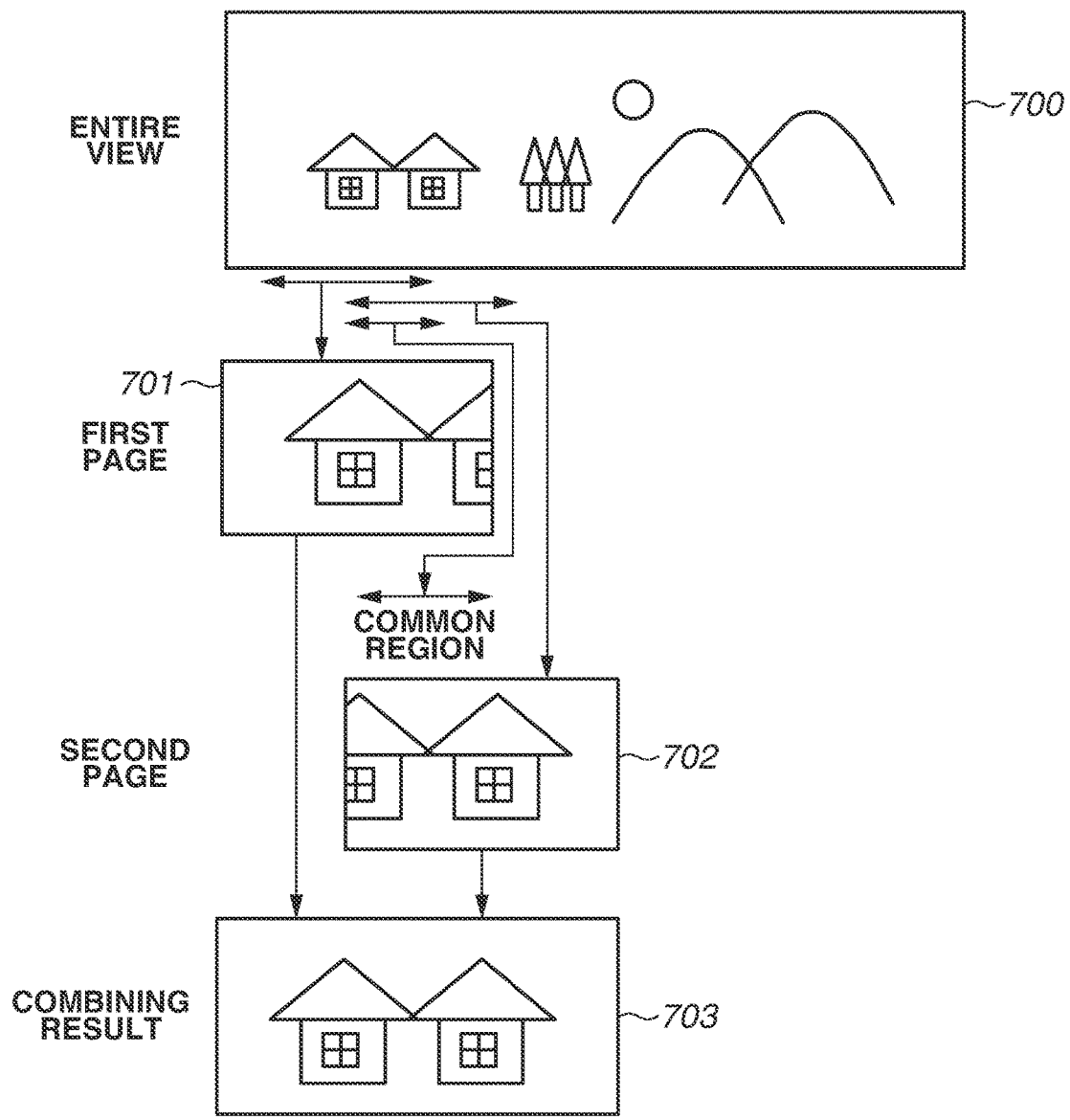
FIG. 4 is a conceptual diagram illustrating images captured during panoramic image capturing and a panoramic combination.

FIG. 4 illustrates an example of an entire view 700 (panoramic image capturing range) during panoramic image capturing, captured images 701 and 702, and a combined image 703. The image capturing angle of the image capturing apparatus 201 is narrower than the entire view 700. In panoramic image capturing, while the image capturing apparatus 201 is swung in the horizontal direction, a plurality of images is captured to obtain overlapping regions of the subject or the like within the angles of view that are adjacent in the horizontal direction. In the example illustrated in FIG. 4, only the first image 701 and the second image 702 captured while the image capturing apparatus 201 is swung in the horizontal direction are illustrated. Between the first image 701 and the second image 702 exists an overlapping region in the horizontal direction. Then, to generate a panoramic image, image combining is performed such that the overlapping regions (overlapping image regions) of the first image 701 and the second image 702 are superimposed to join the two images together. In this way, the image 703 illustrated as a combining result in FIG. 4 is obtained. To generate a panoramic image of the entire view 700 in FIG. 4, images are captured to cover the entire view 700 as described above, and combining processing is performed to superimpose the overlapping regions of the images adjacent in the horizontal direction and join the images together.

Meanwhile, in the case where the user holds the image capturing apparatus 201 and panoramic image capturing is performed while the image capturing apparatus 201 is swung while the user is treated as the rotation axis, for example, there are five possible patterns of the relationship between the rotation axis of the user and the optical axis of the image capturing apparatus 201 as illustrated in FIGS. 3B to 3F. The image capturing lens 101 of the image capturing apparatus 201 of the present exemplary embodiment does not include a tilt function and a shift function, and the optical axis of the image capturing lens 101 is vertical with respect to the image capturing surface of the image capturing sensor 112, and the optical axis center and the image capturing surface center coincide.

Figure 3B:
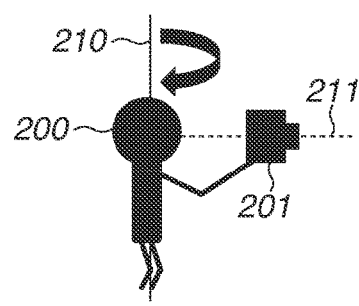

FIG. 3B illustrates the state in panoramic image capturing in which the user 200 holds the image capturing apparatus 201 such that an optical axis 211 is substantially parallel to the horizontal direction and a rotation axis 210 during the swing of the image capturing apparatus 201 is substantially orthogonal to the horizontal direction.

Figure 3C:
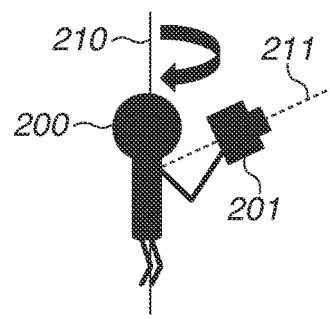

Further, FIG. 3C illustrates the state in which the user 200 holds the image capturing apparatus 201 with the optical axis 211 tilted upward with respect to the horizontal direction and the rotation axis 210 during the swing of the image capturing apparatus 201 is substantially orthogonal to the horizontal direction. For example, to capture an image of a high, rectangular building, etc. standing vertically on the ground (horizontal direction), the user 200 is likely to turn the image capturing apparatus 201 upward to capture an image. Further, the user 200 at this time stands vertically on the ground, so that the rotation axis 210 when the user 200 swings the image capturing apparatus 201 is likely to be orthogonal to the horizontal direction (ground). In this case, the optical axis 211 of the image capturing apparatus 201 and the rotation axis 210 are not orthogonal to each other as illustrated in FIG. 3C.

Figure 3D:
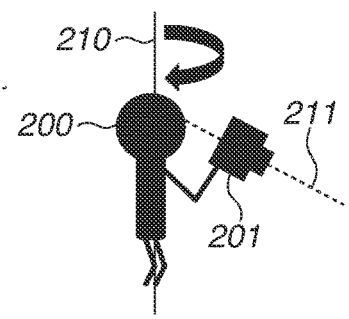

Further, FIG. 3D illustrates the state in which the user 200 holds the image capturing apparatus 201 with the optical axis 211 tilted downward with respect to the horizontal direction and the rotation axis 210 when the image capturing apparatus 201 is swung is orthogonal to the horizontal direction. For example, when capturing images of a view from the top of a tower, an upper floor of a high building, the top of a mountain, etc., the user 200 is likely to turn the image capturing apparatus 201 downward to capture images, and at this time the user 200 stands vertically to the ground (or the floor of the building). In this case, the optical axis 211 of the image capturing apparatus 201 and the rotation axis 210 are not orthogonal to each other as illustrated in FIG. 3D.

Figure 3E:
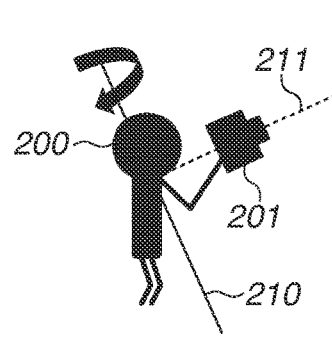

On the other hand, FIG. 3E illustrates the state in which the user 200 holds the image capturing apparatus 201 with the optical axis 211 tilted upward with respect to the horizontal direction and the rotation axis 210 when the image capturing apparatus 201 is swung is substantially orthogonal to the optical axis 211 of the image capturing apparatus 201.

Figure 3F:
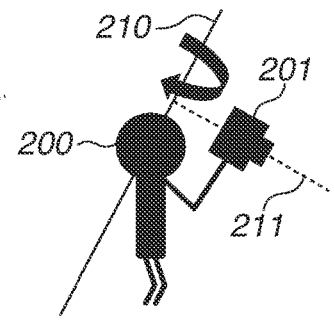

Further, FIG. 3F illustrates the state in which the user 200 holds the image capturing apparatus 201 with the optical axis 211 tilted downward with respect to the horizontal direction and the rotation axis 210 when the image capturing apparatus 201 is swung is substantially orthogonal to the optical axis 211 of the image capturing apparatus 201.

Specifically, in the case of the state illustrated in FIG. 3B, the rotation axis 210 of the user 200 is substantially orthogonal to the horizontal direction, and the optical axis 211 of the image capturing apparatus 201 and the rotation axis 210 of the user 200 are substantially orthogonal to each other. Further, in the cases of the states illustrated in FIGS. 3C and 3D, the rotation axis 210 of the user 200 is substantially orthogonal to the horizontal direction, while the optical axis 211 of the image capturing apparatus 201 and the rotation axis 210 of the user 200 are not orthogonal to each other. On the other hand, in the cases of the states illustrated in FIGS. 3E and 3F, the rotation axis 210 of the user 200 is not orthogonal to the horizontal direction but the optical axis 211 of the image capturing apparatus 201 and the rotation axis 210 of the user 200 are substantially orthogonal to each other.

Meanwhile, a case will be discussed below in which, for example, the horizontal direction of the ground is set as a reference direction and images of a rectangular building, etc. standing vertically with respect to the ground (reference direction) are captured by the image capturing apparatus 201 in a posture state with the optical axis tilted upward or downward with respect to the reference direction. When images of a rectangular building, etc. standing vertically to the ground (reference direction) are captured by the image capturing apparatus 201 with the optical axis tilted with respect to the reference direction, the images with the rectangular building, etc. distorted trapezoidally are acquired. Specifically, for example, in the case where the optical axis 211 of the image capturing apparatus 201 is tilted with respect to the horizontal direction (reference direction) as in FIGS. 3C and 3D, when images of the rectangular building standing vertically to the ground are captured, the images are acquired with the building distorted trapezoidally. Similarly, in the cases illustrated in FIGS. 3E and 3F, since the optical axis 211 of the image capturing apparatus 201 is tilted with respect to the horizontal direction (reference direction), images of the rectangular building standing vertically to the ground are acquired with the rectangular building distorted trapezoidally.

Such trapezoidal distortions occur also in the case where the optical axis 211 of the image capturing apparatus 201 is tilted with respect to the reference direction during panoramic image capturing. Then, if a plurality of images of the trapezoidally distorted building, etc. is simply joined together as in the conventional techniques, a low-quality panoramic image with the building bent and the joints misaligned is generated. However, images that are acquired in the case where panoramic image capturing is performed with the rotation axis 210 tilted with respect to the horizontal direction as in FIGS. 3E and 3F are not images from a range in the horizontal direction such as the entire view 700 in FIG. 4 but images from an arc-shaped range. Thus, in the present exemplary embodiment, the examples illustrated in FIGS. 3E and 3F are excluded, and the cases of panoramic image capturing in the horizontal direction with the rotation axis 210 being vertical to the horizontal direction and the optical axis 211 tilted with respect to the horizontal direction as in the examples illustrated in FIGS. 3C and 3D will be described.

Figure 5A:
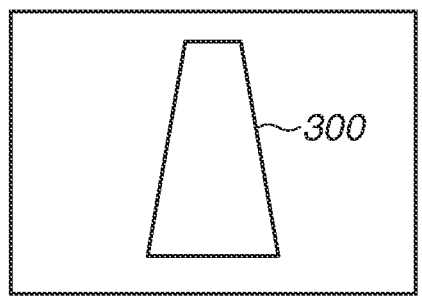
FIGS. 5A and 5B illustrate images captured during panoramic image capturing in the state where the optical axis is sloped.
Figure 5B:
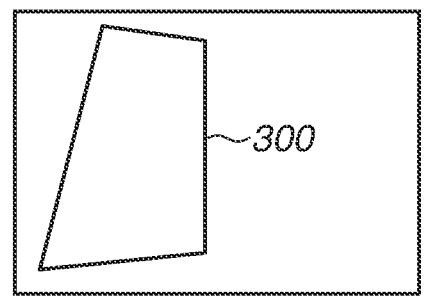

More specifically, for example, panoramic image capturing is performed with the optical axis 211 of the image capturing apparatus 201 tilted upward with respect to the horizontal direction as in FIG. 3C. Thus, a first image acquired by panoramic image capturing contain, for example, a building 300 distorted trapezoidally as illustrated in FIG. 5A. In panoramic image capturing, images are captured while the image capturing apparatus 201 is swung about the user 200 being the rotation axis 210 as in FIG. 3C, so that the building in a captured second image is changed into the shape of the building 300 as in FIG. 5B. Further, in panoramic image combining processing, feature points are extracted from the overlapping regions of the images of FIGS. 5A and 5B to detect motion vectors, and an affine transformation coefficient is calculated from the motion vectors to perform affine transformation. If, for example, the affine transformation is performed by focusing on the right wall of the building 300, the rotation components during the swing are calculated, so that each time an image is sequentially joined, the image of the building 300 is combined upward to the right. Further, trimming a combining result into a rectangle leads to an issue that an effective region is reduced. Further, there is a possible method in which the rotation components are eliminated and then affine transformation and thereafter combining are performed. In this case, however, the joints can be misaligned. As described above, generating a panoramic image from images captured in the state where the optical axis 211 of the image capturing apparatus 201 is tilted with respect to the horizontal direction (reference direction) in panoramic image capturing produces a low-quality panoramic image with the building bent and the joints misaligned.

Thus, the image capturing apparatus 201 of the present exemplary embodiment detects the posture of the image capturing apparatus 201 during the panoramic image capturing and performs projective transformation on a plurality of images acquired by the panoramic image capturing based on the detected posture of the image capturing apparatus 201 to make it possible to generate a high-quality panoramic image, as described below. In the present exemplary embodiment, the posture of the image capturing apparatus 201 is detected as information indicating the angle at which the optical axis 211 of the image capturing apparatus 201 is tilted with respect to the reference direction in the case where the optical axis 211 of the image capturing apparatus 201 is not orthogonal to the rotation axis 210. Then, the projective transformation in the present exemplary embodiment is performed as the processing based on the angle at which the optical axis 211 of the image capturing apparatus 201 is tilted with respect to the reference direction in the case where the optical axis 211 of the image capturing apparatus 201 is not orthogonal to the rotation axis 210.

Further, in the present exemplary embodiment, the case in which panoramic image capturing is performed with the image capturing apparatus 201 swung in the horizontal direction is described as an example, so that the reference direction is set as the horizontal direction of the ground and the vertically trapezoidal distortion is corrected in the example. On the other hand, for example, in the case where panoramic image capturing is performed while the image capturing apparatus 201 is swung in the gravity direction, the reference direction is determined as the gravity direction. In the case where the gravity direction is determined as the reference direction, if the optical axis of the image capturing apparatus 201 is tilted rightward or leftward with respect to the reference direction (gravity direction), the quadrilateral building, etc. is distorted horizontally trapezoidally. In the present exemplary embodiment, horizontal trapezoidal distortions in the case where the gravity direction is determined as the reference direction are also correctable by projective transformation.

Further, the image capturing apparatus 201 of the present exemplary embodiment also performs mapping processing (hereinafter, also referred to as "cylindrical coordinate transformation") on a virtual cylinder with the focal length of the image capturing lens 101 being the radius with respect to images acquired by panoramic image capturing. In this case, the image capturing apparatus 201 of the present exemplary embodiment performs the above-described projective transformation on the images having undergone the cylindrical coordinate transformation.

Then, the image capturing apparatus 201 of the present exemplary embodiment performs combining processing on the images having undergone the cylindrical coordinate transformation and the projective transformation in such a manner that the overlapping regions of the images neighboring to each other in the horizontal direction are superimposed and joined together, thus generating a panoramic image. The image capturing apparatus 201 of the present exemplary embodiment extracts feature points from the overlapping regions of the images having undergone the cylindrical coordinate transformation and the projective transformation and detects motion vectors based on how much the feature points have moved. Details thereof will be described below. Further, the image capturing apparatus 201 of the present exemplary embodiment calculates from the motion vectors, for example, an affine transformation coefficient to perform an affine transformation and superimposes two images such that the respective feature points of the overlapping regions coincide to generate an image in which image regions other than the overlapping regions are joined together in the horizontal direction. The image capturing apparatus 201 of the present exemplary embodiment generates a panoramic image by sequentially repeating the foregoing processing on the images that are neighboring to each other in the horizontal direction.

Operations from the image capturing to the generating and saving of a panoramic image during panoramic image capturing by the image capturing apparatus 201 of the present exemplary embodiment will be described below.

If an instruction to set the panoramic image capturing mode is input from the user via the operation unit 124, the microcomputer 123 sets the image capturing apparatus 201 to the panoramic image capturing mode and performs control to supply power to the image capturing sensor 112 and the A/D converter 115 and performs initial setting. Further, the microcomputer 123 controls the mirror driving circuit 107 to raise the main mirror 105 and controls the shutter driving circuit 111 to open the shutter 110 and cause a subject image formed by the image capturing lens 101 to be formed on the image capturing sensor 112. In this way, an image signal which is read from the image capturing sensor 112 and converted into a digital signal at the A/D converter 115 is transmitted to the image signal processing circuit 116. Further, the microcomputer 123 controls the image signal processing circuit 116 to cause the development circuit 116k to perform development processing, cause the luminance adjustment circuit 116a and the gamma correction circuit 116b to perform image processing, and cause the resizing circuit 116f to perform resizing processing. The image resized by the resizing circuit 116f to a suitable image size for display is transmitted to the display unit 118 and displayed. The image capturing apparatus 201 repeatedly performs the above-described processing, from the image capturing by the image capturing sensor 112 to the display by the display unit 118, 24 to 60 times per second to display a live view.

Further, in the panoramic image capturing mode, for example, the user is required to adjust the angle of view to a desired subject in a wide range such as the entire view 700 in FIG. 4 and then press the SW1 of the image capturing apparatus 201 while checking the live view display on the display unit 118. Then, if the SW1 is pressed by the user, the microcomputer 123 controls the components of the image capturing apparatus 201 to cause the components to calculate a suitable exposure amount for the subject in the angle of view and adjust the focus on the subject in the angle of view in order to prepare for panoramic image capturing. For example, when a live view display is performed, the microcomputer 123 causes an exposure amount calculation circuit (not illustrated) of the image signal processing circuit 116 to calculate an optimum exposure amount and acquires information about the exposure amount. Further, for example, when no live view is displayed, the microcomputer 123 causes the exposure amount calculation circuit 109 to receive light reflected by the sub-mirror 106 and acquire the information about the exposure amount calculated by the exposure amount calculation circuit 109. Then, the microcomputer 123 performs driving control of the aperture 103 via the aperture driving circuit 104, sensitivity control of the image capturing sensor 112, and control of the accumulation period based on the exposure amount. Further, the microcomputer 123 drives the image capturing lens 101 via the AF driving circuit 102 to perform control to adjust the focus on the subject in the angle of view. When the foregoing preparation for panoramic image capturing ends, the microcomputer 123 outputs a buzzing sound from a speaker (not illustrated), etc. to notify the user that the preparation for panoramic image capturing is completed.

A flow of processing during panoramic image capturing by the image capturing apparatus 201 of the present exemplary embodiment will be described with reference to the flowchart in FIG. 6 and the data flow diagram illustrated in FIG. 7. The microcomputer 123 controls the components of the image capturing apparatus 201 to perform the operations specified in the flowchart in FIG. 6. The processing specified in the flowchart can be executed by a hardware configuration. Alternatively a software configuration can realize a part of the processing while the rest of the processing is realized by a hardware configuration. In the case where the processing is executed by a software configuration, for example, a program stored in the non-volatile memory 130 is executed by the microcomputer 123 to realize the processing. The program in the present exemplary embodiment can be provided in the non-volatile memory 130 in advance, read from a removable semiconductor memory, etc., or downloaded from a network such as the Internet (not illustrated).

If the image capturing apparatus 201 is positioned to face the direction from which image capturing is desired during panoramic image capturing and the user presses the SW2, then in step S501, the microcomputer 123 controls the components of the image capturing apparatus 201 to start panoramic image capturing.

If panoramic image capturing is started, then in step S502, the microcomputer 123 acquires lens information. The lens information includes data for correcting distortion/aberration and a decrease in the amount of light in a lens surrounding portion, the focal length for use in cylindrical coordinate transformations, and data on the angle of view. The data for correcting distortion/aberration and a decrease in the amount of light in a lens surrounding portion is, for example, stored in advance in the non-volatile memory 130. Further, the data on the focal length is acquired based on, for example, information such as the amount of focus lens driving by the AF driving circuit 102, and the data on the angle of view is acquired based on the amount of driving of the zoom lens.

Next, in step S503, the microcomputer 123 controls the components of the image capturing apparatus 201 to cause the components to capture a first image. At this time, the image capturing sensor 112 and the A/D converter 115 are set to the driving for live views, so that the microcomputer 123 switches the image capturing sensor 112 and the A/D converter 115 to the driving for still-image capturing. Further, the microcomputer 123 adjusts the aperture 103 via the aperture driving circuit 104 to the determined exposure amount and opens or closes the shutter 110 via the shutter driving circuit 111 to form a subject image on the image capturing sensor 112. In this way, the image capturing sensor 112 captures still images, and image signals read from the image capturing sensor 112 are converted into digital signals at the A/D converter 115. Then, the image signal processing circuit 116 causes a circuit (not illustrated) to perform minimum image processing such as correction processing of correcting the shading of the image capturing sensor 112 on the digital signals from the A/D converter 115. The image data on which the image signal processing circuit 116 has performed minimum processing is stored as first raw image data in the buffer memory 122 via the memory controller 119.

Further, in step S504, the microcomputer 123 initializes (resets) the gyro sensor 133 to enable detection of how much the image capturing apparatus 201 is swung (rotated) during the period from the capturing of the first image to the capturing of the second image.

The first raw image data stored in the buffer memory 122 in step S503 is read by the memory controller 119 and transmitted to the development circuit 116k of the image signal processing circuit 116. The development circuit 116k performs development processing on the raw image to convert the raw image into a first YUV image of luminance (Y) and chrominance (UV) components and transmits the YUV image data to the resizing circuit 116f and the geometric transformation circuit 116e. When the first raw image captured in step S503 is treated as an Nth raw image 605 in the data flow diagram in FIG. 7, the first YUV image is treated as an Nth developed image 606 obtained by developing the Nth raw image 605 in FIG. 7 through the development circuit 116k.

The resizing circuit 116f of the image signal processing circuit 116 performs reduction processing on the first YUV image based on the number of pixels of the display unit 118, and a reduced image acquired as a result of the reduction processing is stored in a VRAM region of the buffer memory 122. When the first YUV image is the Nth developed image 606 in FIG. 7, a reduced image acquired as a result of executing reduction processing on the Nth developed image 606 at the resizing circuit 116f is stored in a VRAM region 608. Then, the first YUV image read from the VRAM region is displayed on the screen of the display unit 118 via the display driving circuit 117. The user can check the image of the first captured in panoramic image capturing by watching the image at the display.

Further, in step S505, the geometric transformation circuit 116e of the image signal processing circuit 116 performs processing of correcting distortion/aberration of the image capturing lens 101 with respect to the YUV images. The distortion/aberration correction processing is an existing technique, so that description thereof is omitted. When the first YUV image is the Nth developed image 606 in FIG. 7, an image acquired as a result of executing the distortion/aberration correction on the Nth developed image 606 in FIG. 7 at the geometric transformation circuit 116e is an Nth geometrically-transformed image 607. The Nth geometrically-transformed image 607 is stored in the buffer memory 122, and when the next image is captured and the movement amount calculation circuit 116c performs movement amount calculation, the Nth geometrically-transformed image 607 is read from the buffer memory 122 as an (N−1)st geometrically-transformed image 603.

Next, in step S506, the microcomputer 123 controls the components of the image capturing apparatus 201 to cause the components to perform second still image capturing. In the second image capturing, the microcomputer 123 controls the exposure amount and the shutter driving as in the first image capturing. Then, the second image signals read from the image capturing sensor 112 are converted into digital signals at the A/D converter 115, undergo minimum image processing at the image signal processing circuit 116, and are stored in the buffer memory 122 as second raw image data, as in the case of the first image signals. In the case where a second raw image is captured, the second raw image corresponds to the Nth raw image 605 in the data flow diagram in FIG. 7.

Further, in step S507, the microcomputer 123 acquires gyro information (gyro information 604 in the data flow diagram in FIG. 7) from the gyro sensor 133. While two-axis information about the yaw and pitch directions of the image capturing apparatus 201 is acquired as the gyro information, it is desirable to acquire three-axis information including information about the roll direction, which is the rotation about the optical axis, in addition to the two-axis information. The output from the gyro sensor 133 is information about the angular velocity, but in panoramic image capturing, it is necessary to detect how much the image capturing apparatus 201 is swung during the period from the previous image capturing to the current image capturing. Thus, the microcomputer 123 integrates the angular velocities from the previous image capturing to the current image capturing, and in the image capturing of second and subsequent images, the microcomputer 123 calculates the rotation angle from the previous image capturing and stores the calculated rotation angles in an internal memory (not illustrated), etc.

Then, in step S508, the microcomputer 123 converts the rotation angles calculated in step S507 into a movement amount expressed by the unit of pixels based on the focal length and the angle of view acquired in step S502 and the number of pixels of the image capturing sensor 112 and pixel pitch information. The movement amount calculated based on the gyro information corresponds to the amount of movement of the image capturing apparatus 201 along the neighboring image capturing directions (image capturing angle), i.e., the amount of swing of the image capturing apparatus 201 between the neighboring image capturing directions, when the images are captured while the image capturing direction is sequentially changed.

In general, the angle of view α [°] of the lens without distortion/aberration (or the angle of view α after distortion/aberration correction) is calculated from formula (1) below $$\alpha \ [\text{fd}°]=2\times\arctan(w \ [\text{mm}]\div 2\div f \ [\text{mm}]) \quad \text{formula (1)},$$

where f [mm] is an effective focal length, and w [mm] is an effective image capturing area width of the image capturing sensor 112.

Further, the movement amount d [pix] in the image which corresponds to the amount of swing is calculated from formula (2)

$$d \ [\text{pix}]=\tan(\beta[°]2)\times f \ [\text{mm}]/p \ [\mu\text{m}]\times 1000 \quad \text{formula (2)},$$

where p [μm] is the size of the image capturing sensor 112 per pixel, and β [°] is the swing angle of the image capturing apparatus 201 based on the gyro information.

The second raw image data stored in the buffer memory 122 in step S506 is performed development processing on by the development circuit 116k of the image signal processing circuit 116 and is converted into a second YUV image as in the case of the first raw image data. When the second raw image captured in step S506 is the Nth raw image 605 in FIG. 7, the second YUV image is the Nth developed image 606 acquired as a result of executing development on the Nth raw image 605 in FIG. 7 at the development circuit 116k. Then, the second YUV image is performed reduction processing by the resizing circuit 116f of the image signal processing circuit 116 and is stored in the VRAM region, and then the second YUV image is displayed on the screen of the display unit 118 via the display driving circuit 117, as in the case of the first YUV image. The user can check the image of the second captured in panoramic image capturing by watching it at the display.

Further, in step S509, the geometric transformation circuit 116e of the image signal processing circuit 116 performs distortion/aberration correction processing on the second YUV image as in the case of the first YUV image.

Then, in step S510, the microcomputer 123 causes the geometric transformation circuit 116e of the image signal processing circuit 116 to perform a cylindrical coordinate transformation. The virtual cylinder in the cylindrical coordinate transformation is desirably set to the focal length of the image capturing lens 101. In general, a point (x, y) on a captured image after the distortion/aberration correction is performed is projected onto a point (x·cos θ, y·cos θ) as a result of a cylindrical coordinate transformation. In this case, θ [rad] is expressed by formula (3)

$$\theta \text{ [rad]} = \arctan(x \cdot p \text{ [μm]} \times 1000 \div r \text{ [mm]}) \quad \text{formula (3)},$$

where r [mm] is the radius of the virtual cylinder.

In the present exemplary embodiment, the cylindrical coordinate transformation and the distortion/aberration correction described above are both performed at the geometric transformation circuit 116e. Thus, the geometric transformation circuit 116e can perform the cylindrical coordinate transformation and the distortion/aberration correction either separately as described above or simultaneously. Further, in the case where intervals between the capturing of images in panoramic image capturing are short and, for example, the difference between first and second images is little, the cylindrical transformation can be omitted. In the case where the second YUV image is the Nth developed image 606 in FIG. 7, an image acquired as a result of execution of the cylindrical coordinate transformation and the distortion/aberration correction on the Nth developed image 606 in FIG. 7 at the geometric transformation circuit 116e is the Nth geometrically-transformed image 607. The Nth geometrically-transformed image 607 is stored in the buffer memory 122, and when the next image (third image) is captured and the movement amount calculation circuit 116c calculates the movement amount, the stored Nth geometrically-transformed image 607 is read as the (N−1)st geometrically-transformed image 603 from the buffer memory 122.

Next, in step S511, the microcomputer 123 causes the geometric transformation circuit 116e of the image signal processing circuit 116 to perform a projective transformation. In the case of the present exemplary embodiment, however, the projective transformation is performed if the image capturing apparatus 201 is swung in the state in which the optical axis 211 of the image capturing apparatus 201 is not orthogonal to the rotation axis 210 in panoramic image capturing as illustrated in FIGS. 3C and 3D described above. On the other hand, in the case where, for example, the image capturing apparatus 201 is swung in the state in which the optical axis 211 of the image capturing apparatus 201 is orthogonal to the rotation axis 210 as described above as in FIGS. 3A, 3E, and 3F, no projective transformation is performed. Details of the projective transformation performed at the geometric transformation circuit 116e in the state in which the optical axis of the image capturing apparatus 201 is not orthogonal to the rotation axis will be described below.

Next, in step S512, the movement amount calculation circuit 116c calculates the movement amount corresponding to the motion vector using the Nth geometrically-transformed image 607 and the (N−1)st geometrically-transformed image 603 in the image signal processing circuit 116.

The movement amount can be obtained by using, for example, a publicly known calculation method using edges detected from images and feature points extracted from the images. The movement amount calculation circuit 116c in the present exemplary embodiment, for example, detects edges in images and extracts several feature points to calculate the movement amount.

Further, the movement amount calculation circuit 116c samples the extracted feature points to calculate an affine transformation coefficient. In FIG. 7, the movement amount calculation circuit 116c calculates an affine transformation coefficient 609 using the (N−1)st geometrically-transformed image 603 and the Nth geometrically-transformed image 607.

Then, in step S513, the microcomputer 123 controls the image signal processing circuit 116 to cause the alignment circuit 116d to align the Nth and (N−1)st images based on the movement amount calculated using the feature points at the movement amount calculation circuit 116c. In the case of the present exemplary embodiment, the alignment circuit 116d performs alignment using, for example, affine transformation. In FIG. 7, an aligned image 611 by the alignment circuit 116d is acquired.

In an example case in which the coordinates (x, y) of a feature point to be a reference move to the coordinates (u, v), the movement of the coordinates of the feature point is expressed by formulas (4) to (6) below.

$$\begin{pmatrix} u \\ v \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix}. \quad \text{formula (4)}$$

The 3×3 matrix or coefficients a to f of formula (4) is referred to as "affine coefficient".

For example, there is a case where a feature point 1 is shifted from the coordinates (x1, y1) to the coordinates (u1, v1), a feature point 2 from the coordinates (x2, y2) to the (u2, v2), and a feature point 3 from the coordinates (x3, y3) to the coordinates (u3, v3). In this case, if simultaneous equations are made from formula (4), formulas (5) and (6) are obtained. By solving the equations, the affine coefficients a to f can be derived.

$$\begin{pmatrix} x1 & y1 & 1 \\ x2 & y2 & 1 \\ x3 & y3 & 1 \end{pmatrix} \begin{pmatrix} a \\ b \\ c \end{pmatrix} = \begin{pmatrix} u1 \\ u2 \\ u3 \end{pmatrix}. \quad \text{formula (5)}$$

$$\begin{pmatrix} x1 & y1 & 1 \\ x2 & y2 & 1 \\ x3 & y3 & 1 \end{pmatrix} \begin{pmatrix} d \\ e \\ f \end{pmatrix} = \begin{pmatrix} v1 \\ v2 \\ v3 \end{pmatrix}. \quad \text{formula (6)}$$

In the case where feature points of four or more points are extracted, the feature points excluding the feature points located close to each other can be normalized using a least-square method. Further, the movement amount calculation circuit 116c can determine that the calculation of the movement amount based on the feature points has failed if no three feature points are successfully extracted, if extracted three feature points are aligned linearly, or if two points out of three feature points are close.

Further, when the movement amount (affine coefficient) calculated using the feature points is significantly different from the movement amount calculated based on the gyro information, it is considered that the images contain, for example, a repeated pattern or a moving object. In this case, the movement amount can be calculated under different conditions. Further, this captured image can be determined as an unsuccessful image and returned to the next image capturing processing, or the panoramic image capturing can be determined as being unsuccessful and the process of the flowchart in FIG. 6 can be ended.

Next, in step S514, the combining circuit 116j of the image signal processing circuit 116 combines together the Nth and (N−1)st images aligned based on the movement amount (affine coefficient) calculated using the feature points in step S512 described above. Specifically, in the case where the image signal processing circuit 116 performs processing on an Nth (N>2) image, a combined image 610 of the previous images up to the (N−1)st image is combined with the Nth aligned image 611. A combined image 612 by the combining circuit 116j corresponds to a combined image generated by superimposing and joining the above-described overlapping regions together. If the panoramic image capturing range includes, for example, a subject that moves continuously such as the water surface, the quality of a combining result can deteriorate, so that the combining ratio of boundary portions of images to be combined together can be changed to improve the quality.

Next, in step S515, the microcomputer 123 determines whether the image capturing of all images for use to generate a panoramic image by panoramic image capturing has ended. For example, if pressing of the SW2 is continued, the microcomputer 123 determines that the next image capturing is to be performed (YES in step S515), and the processing returns to step S506 to perform the next image capturing.

On the other hand, in step S515, if the microcomputer 123 determines that pressing of the SW2 is cancelled and the image capturing is ended (NO in step S515), then in step S516, the microcomputer 123 causes compression/decompression circuit 116l to perform compression processing to compress the combined image 612 into a general format such as JPEG. Then, in step S517, the microcomputer 123 saves the compressed image data in the memory 120 via the memory controller 119. Prior to the compression processing, gamma correction can be performed at the gamma correction circuit 116b to make dark portions of the combined image 612 more visible and, furthermore, color tone correction can be performed to realize a uniform color tone across the image. Further, if the size of the combined image is large, resizing can be performed at the resizing circuit 116f to adjust the size to a size designated in advance by the user. Further, with shakes and the like taken into consideration, cutout may be performed in a maximum inscribed rectangle or a predetermined region by the trimming circuit 116g and then the cutout region is saved.

Figure 6:
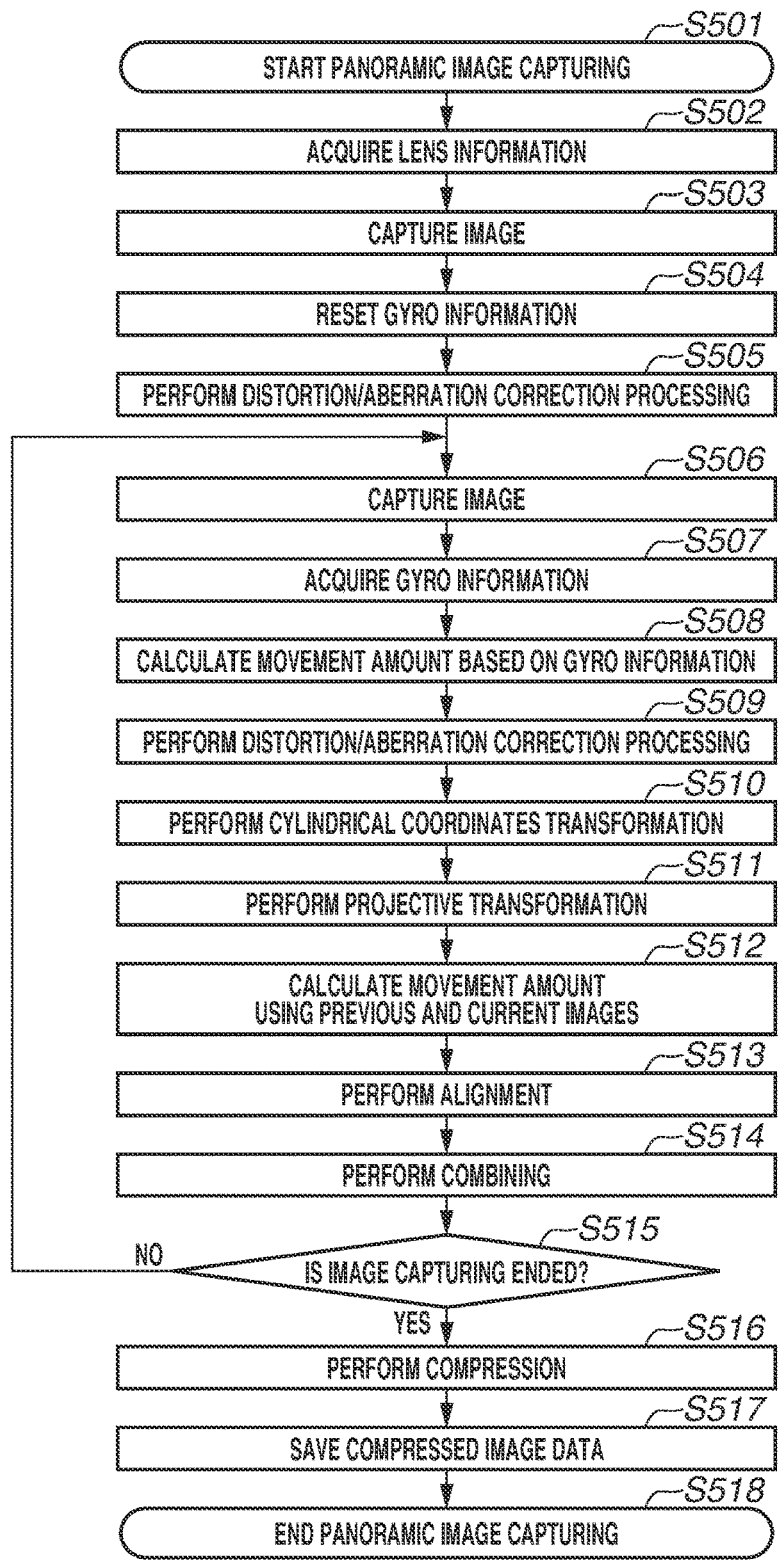
FIG. 6 is a flowchart illustrating a flow of processing during panoramic image capturing.
Figure 7:
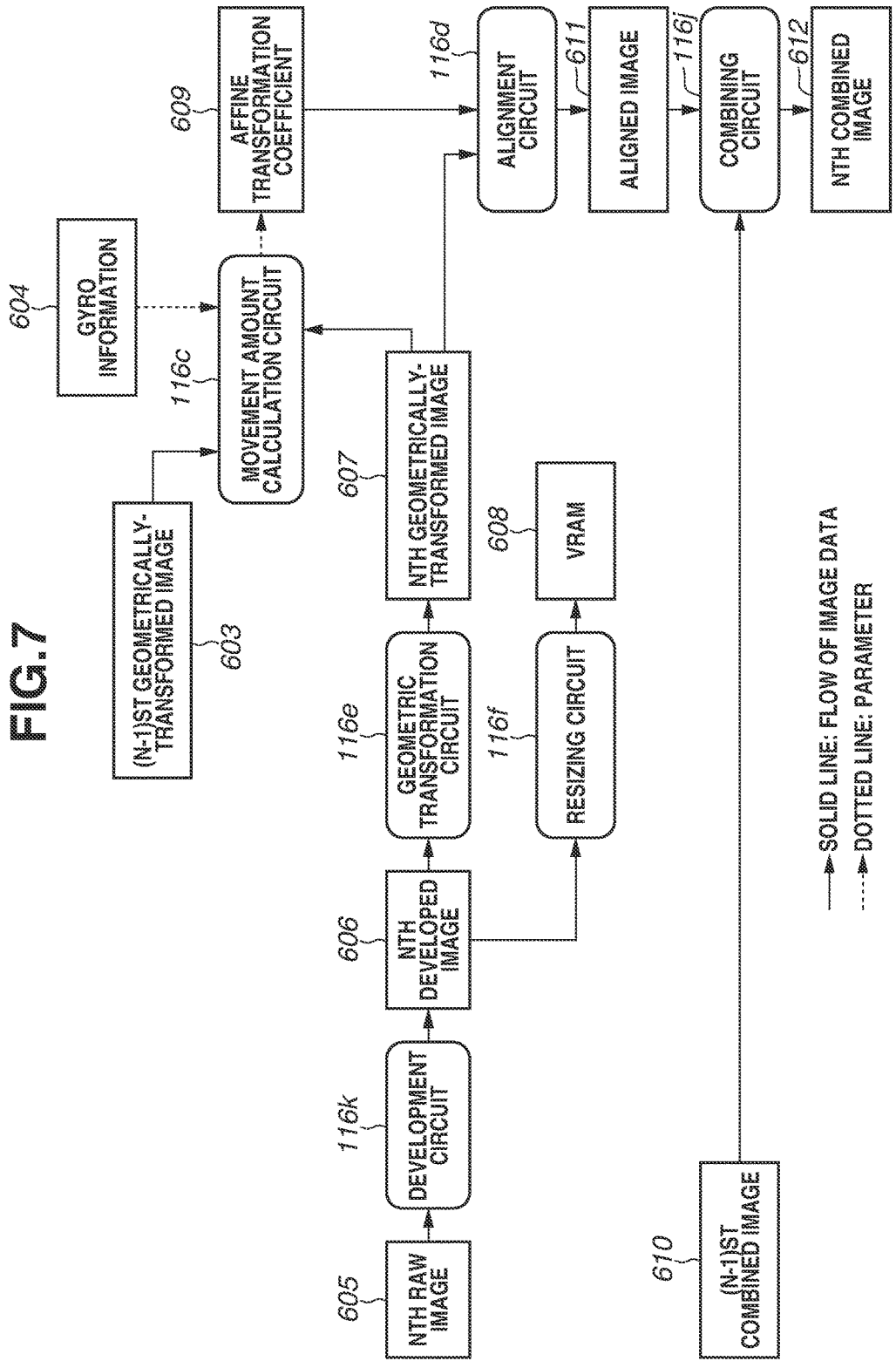
FIG. 7 is a diagram illustrating a data flow during panoramic image capturing.

The following describes the projective transformation performed by the geometric transformation circuit 116e in step S511 in FIG. 6. In the case of the present exemplary embodiment, in panoramic image capturing, the geometric transformation circuit 116e performs a projective transformation on the image captured while the image capturing apparatus 201 is swung in the state in which the optical axis 211 of the image capturing apparatus 201 is not orthogonal to the rotation axis 210 as in FIGS. 3C and 3D described above.

In the case where images are captured while the image capturing apparatus 201 is swung in the state where the optical axis 211 of the image capturing apparatus 201 and the rotation axis 210 are not orthogonal to each other as in FIGS. 3C and 3D described above, the above-described affine transformation coefficient contains rotation components. Thus, the geometric transformation circuit 116e of the present exemplary embodiment performs a projective transformation to correct trapezoidal distortion without rotating the image.

Figure 8A:
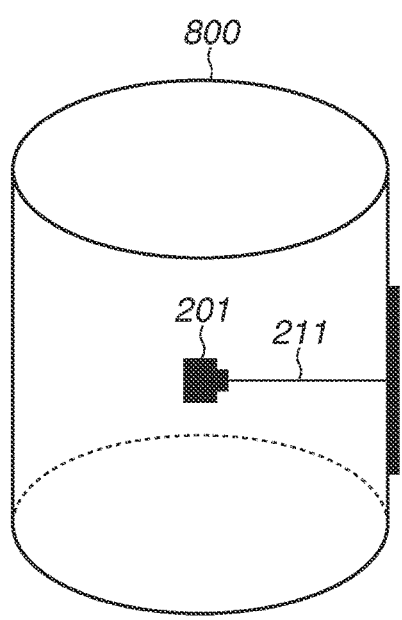
FIGS. 8A and 8B are diagrams illustrating a cylindrical coordinate transformation with respect to an image in the case where the optical axis is sloped.

For example, in the case where the optical axis of the image capturing apparatus 201 is orthogonal to the rotation axis, the cylindrical coordinate transformation is performed to situate the image center directly in front of the cylinder so that the coordinates remain unchanged even after the image center is cylindrically transformed as illustrated in FIG. 8A.

Figure 8B:
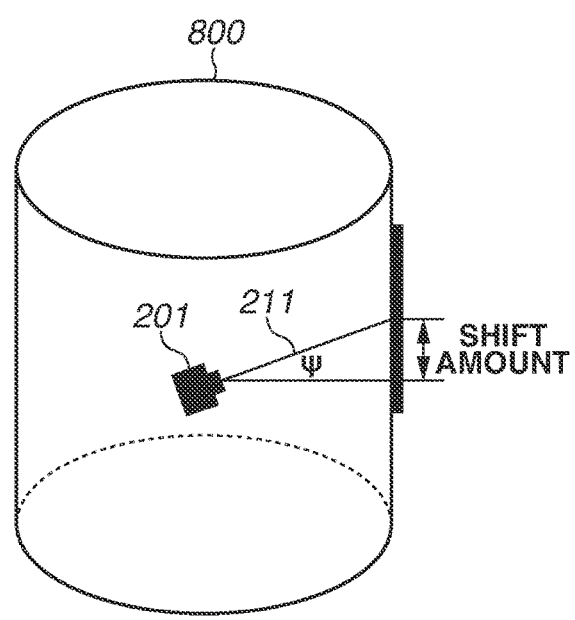

On the other hand, in the case where the optical axis 211 of the image capturing apparatus 201 and the rotation axis 210 are not orthogonal to each other, as in FIG. 8B, projection is performed with the projection surface of the virtual cylinder displaced (shifted) upward or downward based on the angle between the optical axis 211 of the image capturing apparatus 201 and the reference direction (horizontal direction). Specifically, in the case where the angle between the optical axis 211 and the reference direction is ψ, a shift amount SV [pix] is calculated from formula (7), and projection is performed with the center coordinates displaced (shifted) by the shift amount SV [pix]. In formula (7), f is the focal length of the image capturing lens 101, and p is the pixel pitch (length per pixel).

$$SV \text{ [pix]} = \tan \psi f \text{ [mm]} \times 1000/p \text{ [}\mu\text{m]} \qquad \text{formula (7)}.$$

Further, in panoramic image capturing, center portions of images are cut and combined together as described above, so that approximation by trapezoid correction is possible. This correction cannot be realized by affine transformation, so that a projective transformation expressed by formula (8) is used to realize the correction in the present exemplary embodiment.

$$x' = \frac{ax + by + c}{gx + hy + 1} \qquad \text{formula (8)}$$

$$y' = \frac{dx + ey + f}{gx + hy + 1}.$$

In the projective transformation expressed by formula (8), the original coordinates (x, y) are geometrically transformed into the coordinates (x', y'), and coefficients a to h in formula (8) are projective transformation coefficients. The coefficients a to f are equivalent to the affine transformation coefficients, and the coefficients g and h are coefficients relating to the trapezoid correction. In the case where the image capturing apparatus 201 is swung in the landscape direction (horizontal direction) as in the present exemplary embodiment, i.e., the case where a trapezoidal distortion with the upper base and bottom base being parallel is transformed into a rectangle, particularly the coefficient h is important.

Figure 9A:
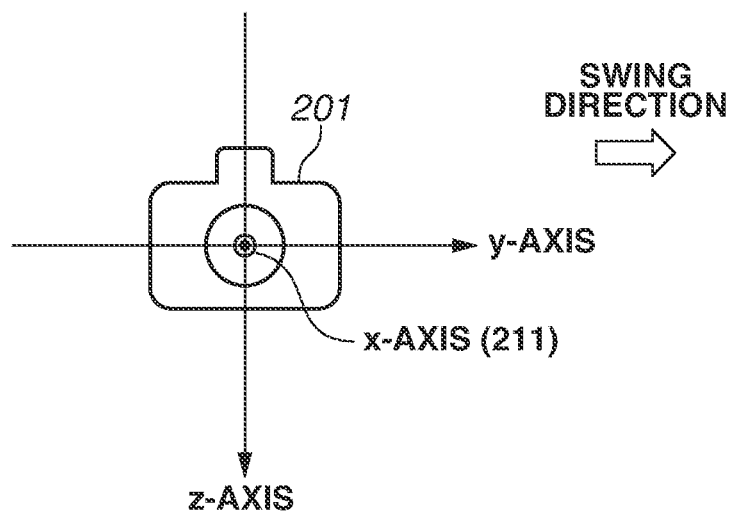
FIGS. 9A and 9B are conceptual diagrams illustrating a detection axis of an acceleration sensor.
Figure 9B:
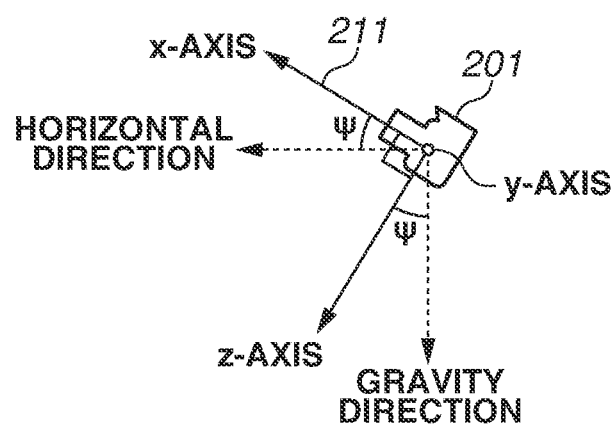

The coefficient h is calculated from the focal length of the image capturing lens 101 and the angle between the optical axis and the rotation axis. Further, the optical axis is calculable from the output of the acceleration sensor 135. FIGS. 9A and 9B illustrate the x-, y-, and z-axis of the acceleration sensor 135, and the ratio between the values of the acceleration sensor 135 on the z-axis (vertical direction) and the x-axis (optical axis direction) of the image capturing apparatus 201 can be calculated as the pitch angle (ψ) of the image capturing apparatus 201 by calculating the arctan.

Meanwhile, it is often difficult to calculate the angle of the rotation axis from, for example, the output of the acceleration sensor 135 and the output of the gyro sensor 133 in the first image capturing and the second image capturing. Although it depends on the swing speed at which the user swings the image capturing apparatus 201, the rotation angle is normally about 0° to 20°, and the swing speed at the beginning of image capturing is slow. Accordingly, with sensor noise taken into consideration, it is difficult to accurately calculate the angle of the rotation axis. However, in general users are likely to stand vertically to the ground while capturing images, so that the direction of swing, which is a rotation about the rotation axis, can be assumed to be the horizontal direction.

Thus, the coefficient h is calculable from, for example, formula (9) below. In formula (9), ψ is the angle of the pitch direction obtained from the acceleration sensor 135, and f is the effective focal length of the image capturing lens 101.

$$h=\tan(\psi)/f \qquad \text{formula (9)}.$$

In the present exemplary embodiment, the calculation is performed based on the assumption that the swing direction, being the direction of rotation about the rotation axis, is the horizontal direction as described above. In the case where the images are combined together after the panoramic image capturing is ended, a plurality of pieces of sensor information that is already acquired at the time of image capturing can be analyzed in advance, not as in the case where the images are sequentially combined each time an image is captured, so that the coefficient h is calculable from the angle between the rotation axis and the optical axis.

Further, while the coefficient h is calculated from the output of the acceleration sensor 135, etc. in the present exemplary embodiment, the coefficients g and h are calculable if at least four motion vectors are successfully calculated, as in the case where the affine coefficient is calculated from formulas (8) and (9).

While the example in which the image capturing apparatus 201 being held in the regular position (landscape position) is swung in the landscape direction (horizontal direction) as in FIG. 9A is described in the present exemplary embodiment, the case in which the image capturing apparatus 201 held in the portrait position to increase the angle of view is swung in the landscape direction (horizontal direction) is also encompassed within the scope of the present exemplary embodiment. On the other hand, in the case where the image capturing apparatus 201 is swung in the gravity direction (portrait direction), the rotation axis and the optical axis are likely to be orthogonal to each other, so that the present exemplary embodiment is less likely to be applied. Further, in the case where the image capturing apparatus 201 is swung in the gravity direction (vertical direction), the swing causes the gravity direction to change each time image capturing is performed, so that it is difficult to detect an amount of deviation from the state in which the rotation axis and the optical axis are orthogonal to each other. Thus, in this case, the coefficients g and h are calculated from the image.

As described above, in the present exemplary embodiment, in the case where panoramic image capturing is performed in the posture and state in which the optical axis of the image capturing apparatus 201 and the rotation axis of the image capturing apparatus 201 being swung are not orthogonal to each other, a projective transformation is performed to correct trapezoidal distortions. In this way, high-quality panoramic images with reduced displacements, etc. in combining panoramic images are generated.

Second Embodiment

Next, a second exemplary embodiment will be described below. While the projective transformation for trapezoid correction is performed after the cylindrical transformation in the first exemplary embodiment, the case in which a geometric transformation for projection onto a truncated cone is performed will be described in the second exemplary embodiment.

In the case where images are captured at short image capturing intervals in panoramic image capturing and, for example, the difference between the captured Nth and N+1 images is small, an approximation by trapezoidal distortion correction through a cylindrical transformation and projective transformation for projection onto the side surface of a cylinder as in the first exemplary embodiment is possible. However, in the case where the difference between the captured Nth and N+1 images is significant due to long image capturing intervals in panoramic image capturing or due to a high swing speed of swings by the user, it is desirable to perform a geometric transformation of truncated cone transformation for projection onto the side surface of a truncated cone.

Thus, in the case of the second exemplary embodiment, the cylindrical coordinate transformation and the projective transformation for trapezoidal distortion correction in steps S510 and S511 in the flowchart in FIG. 6 are realized by a truncated cone transformation for projection onto the side surface of a truncated cone. In the projection transformation onto a truncated cone, the projection radius varies depending on the height of a virtual truncated cone, unlike the case with the cylindrical coordinate transformation.

In the case of the second exemplary embodiment, r in formula (3) replaced by r' (projection radius corresponding to the height of the virtual truncated cone) calculated from formula (10), where ψ is the angle between the optical axis of the image capturing apparatus 201 and the reference direction (horizontal direction), and the point (x, y) is a point on a captured image after distortion/aberration correction. In formula (10), f is the effective focal length of the image capturing lens 101.

$$r'=f-y\cdot\tan\psi \qquad \text{formula (10)}.$$

As described above, in the second exemplary embodiment, the projection transformation onto a truncated cone is performed to enable correction with greater accuracy than the approximation by the cylindrical transformation and the trapezoidal distortion correction in the first exemplary embodiment.

Third Embodiment

Next, a third exemplary embodiment will be described below.

In the first exemplary embodiment described above, the projective transformation is used to correct trapezoidal distortions in order to reduce displacements, etc. during the combining in the case where the rotation axis and the optical axis are not orthogonal to each other. However, in the case where, for example, a captured image includes a building standing vertically to the ground as a subject and another subject in the horizontal direction, such as the ground or road, displacements during the combining are sometimes conspicuous. This is due to a difference in the amount of distortion correction between the images of a subject that is vertical to the ground, such as a building, and the images of a subject in the horizontal direction, such as the ground and road. Especially, since the amount of correction of the subject in the horizontal direction varies depending on the height of a reference plane (e.g., horizontal plane such as the ground) of the reference direction and, furthermore, differs from the amount of correction of a vertical subject, it is difficult to accurately correct both the horizontal and vertical subjects.

Thus, in the third exemplary embodiment, in the case where the optical axis of the image capturing apparatus 201 and the rotation axis are not orthogonal to each other, the amount of correction is changed according to whether the optical axis of the image capturing apparatus 201 is in the state in which the optical axis is tilted in a predetermined direction with respect to the reference direction or in the state in which the optical axis is tilted in the opposite direction to the predetermined direction. In the present exemplary embodiment, the state in which the optical axis is tilted in the predetermined direction refers to, for example, the state in which the optical axis of the image capturing apparatus 201 is tilted downward with respect to the reference direction. In the third exemplary embodiment, in the case where the optical axis of the image capturing apparatus 201 is tilted downward with respect to the reference direction, the calculation of the projective transformation coefficient (the coefficient h in formula (9) described above) is not performed or a weaker projective transformation coefficient than that in the case where the optical axis is tilted upward with respect to the reference direction is calculated. Specifically, in the case where the optical axis of the image capturing apparatus 201 is tilted downward with respect to the reference direction, the coefficient h in formula (9) described above is multiplied by a weighting coefficient of 0 to 0.5, etc. For example, in the case where the coefficient h is multiplied by a weighting coefficient of 0, no distortion correction is performed. Further, in the case where the coefficient h is multiplied by, for example, a weighting coefficient of 0.5, the distortion correction to be performed is weaker than that performed in the case where the optical axis is tilted upward (opposite direction to the predetermined direction) with respect to the reference direction (e.g., weighting coefficient of 1). Further, in the case where the optical axis is tilted downward with respect to the reference direction, since errors are likely to be small when the slope angle is small, smaller weighting coefficients can be set for larger downward slope angles.

As it is known from formula (9), the shorter the focal length (f) of the image capturing lens 101 is, the greater the coefficient h becomes to have more impact. Further, the shorter the focal length is, the wider the angle of view becomes, and the possibility that the subject of the building standing vertically to the ground and the subject in the horizontal direction such as the ground or road exist in the same image becomes high, although it depends on the subjects. Thus, in the case of the third exemplary embodiment, it is desirable to change, based on the focal length, the weighting coefficient by which the coefficient h is to be multiplied. Specifically, in the third exemplary embodiment, it is desirable to increase the weighting coefficient by which the coefficient h is to be multiplied, as the focal length becomes shorter.

In the third exemplary embodiment, the example will be described below in which the weighting coefficient by which the coefficient h is to be multiplied is changed based on the angle between the optical axis of the image capturing apparatus 201 and the reference direction in the case where the optical axis of the image capturing apparatus 201 and the rotation axis are not orthogonal to each other.

For example, in the case where the user places the image capturing apparatus 201 such that the center of the optical axis of the image capturing apparatus 201 is situated in the position at which the height from the reference plane (ground) in the reference direction is 0 m, the percentage of an above-ground portion, such as the ground, sky, and building, within the angle of view is calculable from formula (11). In formula (11), $\psi$ is the angle between the optical axis and the reference direction, and a is the angle of view in the height direction that is calculated from formula (1). Each percentage is set to zero if the calculation result is a negative number, whereas each percentage is set to one if the calculation results exceed one.

The percentage of the ground portion in a captured image=$\{\tan(\alpha/2)+\tan(\psi)\}/\{2\cdot\tan(\alpha/2)\}$, and the percentage of the above-ground portion in a captured image=$\{\tan(\alpha/2)-\tan(\psi)\}/\{2\cdot\tan(\alpha/2)\}$   formula (11).

Further, in the case where the size of the effective image capturing area of the image capturing sensor 112 is APS-C size with a width of 22.32 mm and a height of 14.88 mm and the focal length of the image capturing lens 101 is 18 mm, the angle of view $\alpha$ calculated from formula (1) is approximately 45°. Thus, for example, when the height of APS-C size is calculated as w in formula (1), an image captured in the case where the angle between the optical axis and the reference direction is sloped downward by approximately 22.5° is entirely the ground, i.e., only the reference plane is captured. On the other hand, in the case where the angle is sloped upward by 22.5° ($\psi=-22.5°$), the above-ground portion such as a building and sky is captured approximately 100%.

Thus, a value obtained by multiplying the coefficient h calculated from formula (9) by the percentage of the above-ground portion in the captured image as a correction coefficient is used in actual projective transformation. Further, in such cases, if the angle between the optical axis and the reference direction is a downward sloped, the trapezoidal distortion correction is not likely to be applied, so that it is also desirable to multiply the coefficient h by a value obtained by adding a numerical value of 0 to 0.5 to the percentage that the above-ground portion is captured from formula (11). The numerical value can be tuned as appropriate as a design matter.

In the above-described example, it is assumed that the image capturing apparatus 201 (optical axis) is disposed at the position 0 m from the reference plane (ground). Since the subjects are often located at great distances in panoramic image capturing, calculations based on the assumption is not likely to lead to a problem. Further, more specifically, it is desirable to calculate the ratio between a vertically-standing subject and a horizontal subject, and this calculation is possible by generating a range map from parallax information (not illustrated). For example, in a scene in which a townscape is looked down from a tall building, small houses and buildings often have high-frequency components, and in many cases, even if a displacement occurs during the combining, the displacement is not significantly visible. On the other hand, a displacement that occurs in a portion projecting upward from the horizontal line is likely to be visible. This is because the subject in the portion projecting upward from the horizontal line is in a low-frequency portion such as the sky, as the background, so that the displacement is likely to be visible. Thus, the percentage of the captured ground, which is calculated from formula (11), is multiplied by an image size (height) to obtain a horizontal line in the image, a portion above the horizontal line is divided into blocks to extract edges, and integration results thereof are calculated to calculate an amount by which the subject other than low-frequency components such as the sky is captured. Weighting the coefficient h based on the calculated amount is also a desirable exemplary embodiment.

In the third exemplary embodiment, the example is described in which when the trapezoidal distortion correction is performed after the cylindrical transformation as described above in the first exemplary embodiment, the amount of correction is changed based on whether the slope between the optical axis and the reference direction is upward or downward. In the third exemplary embodiment, an application to the example is possible in which the projection is performed onto a truncated cone as in the second exemplary embodiment described above. For example, in the case of a downward slope, implementation becomes possible by multiplying tan ψ by a weighting coefficient of 0 to 0.8. In this case, it is also desirable to multiply a weighting coefficient based on the percentage of the ground in the captured image and the amount of the subject in the portion above the horizontal line in the captured image, as in the above-described cases.

While exemplary embodiments of the present invention have been described above, the present invention is not limited to the disclosed exemplary embodiments, and various modifications and changes are possible within the spirit of the invention. The image processing apparatus in the present exemplary embodiment can be, for example, an apparatus not provided with the image capturing sensor 112 and the image capturing lens 101 and that acquires from an external memory, such as a memory card, panoramically-captured angle images, lens information and posture information in the image capturing so as to perform panoramic combining. Further, the image processing apparatus in the present exemplary embodiment encompasses programs for operating the above-described processing on a computer and recording mediums storing the same.

The image capturing apparatus of the present exemplary embodiment is applicable to not only digital cameras but also digital video cameras, various mobile terminals having camera functions, such as smartphones and tablet terminals, as well as industrial cameras, vehicle-mounted cameras, medical cameras, etc.

Embodiments of the present invention are realizable also by a process in which a program for implementing one or more functions of the above-described exemplary embodiments is supplied to a system or apparatus via a network or storage medium and one or more processors of a computer of the system or apparatus read and execute the program. Further, embodiments of the present invention are realizable also by a circuit (e.g., application-specific integrated circuit (ASIC)) configured to realize the one or more functions.

The exemplary embodiments described above are mere illustration of implementations of the present invention and are not intended to limit the technical scope of the invention. Specifically, embodiments of the present invention can be implemented in various forms without departing from the technical concept or major features thereof.

Embodiments of the present invention are capable of generating high-quality panoramic images even if the image capturing is performed in the state where the posture of the image capturing apparatus is sloped during the panoramic image capturing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-152410, filed Aug. 7, 2017, which is hereby incorporated by reference herein in its entirety.

What is claimed is:

1. An image processing apparatus, comprising:
   at least one memory configured to store instructions; and
   at least one processor connected to the at least one memory and configured to execute the instructions to:
   calculate an amount of movement along an image capturing direction where neighboring images captured adjoin while the image capturing direction is sequentially changed;
   calculate a coefficient of a projective transformation with respect to each image based on information about a posture of an image capturing apparatus when the image is captured;
   perform the projective transformation on each image using the coefficient calculated based on the information about the posture to correct a trapezoidal distortion that occurs in each image;
   perform alignment, based on the amount of movement, along the image capturing direction after the projective transformation is performed; and
   combine the images on which the alignment has been performed by joining the images together in an order in which the image capturing direction is changed.

2. The image processing apparatus according to claim 1, wherein the at least one processor executes further instruction to perform a cylindrical transformation to project each captured image onto a virtual cylinder, and perform the projective transformation on the image on which the cylindrical transformation has been performed.

3. The image processing apparatus according to claim 1, wherein the at least one processor executes further instruction to calculate a slope of an optical axis of an image capturing lens with respect to a reference direction based on the information about the posture of the image capturing apparatus, and to calculate the coefficient based on information about the slope.

4. The image processing apparatus according to claim 3, wherein the at least one processor executes further instruction to, in a case where the optical axis is sloped in a predetermined direction with reference to the reference direction, not calculate the coefficient or calculate a weighted coefficient which is less than the coefficient in a case where the optical axis is sloped in an opposite direction to the predetermined direction with respect to the reference direction.

5. The image processing apparatus according to claim 4, wherein the at least one processor executes further instruction to change a weight used in calculation of the weighted coefficient based on an angle of the slope in the case where the optical axis is sloped in the predetermined direction with respect to the reference direction.

6. The image processing apparatus according to claim 3, wherein the at least one processor executes further instruction to calculate the slope based on information about the image capturing lens of an image capturing apparatus which captures each image and the information about the posture of the image capturing apparatus when the image capturing apparatus captures each image.

7. The image processing apparatus according to claim 3, wherein the reference direction is a horizontal direction.

8. The image processing apparatus according to claim 1, wherein the at least one processor executes further instruction to perform the projective transformation in a case where an optical axis of an image capturing lens of the image capturing apparatus is not orthogonal to a rotation axis when the image is captured while the image capturing direction is sequentially changed to rotate on the rotation axis.

9. The image processing apparatus according to claim 1, further comprising a gyro or/and accelerator configured to detect the posture of the image capturing apparatus during the capturing of the image.

10. An image processing apparatus, comprising:
at least one memory configured to store instructions; and
at least one processor connected to the at least one memory and configured to execute the instructions to:
calculate an amount of movement along an image capturing direction where neighboring images captured adjoin while the image capturing direction is sequentially changed;
calculate a coefficient of a geometric transformation for projecting each image onto a virtual truncated cone based on information about a posture of an image capturing apparatus when the image is captured;
perform the geometric transformation using the coefficient to project each image onto the virtual truncated cone;
perform alignment, based on the amount of movement, along the image capturing direction after the geometric transformation is performed; and
combine the images on which the alignment has been performed by joining the images together in an order in which the image capturing direction is changed.

11. The image processing apparatus according to claim 10, wherein the at least one processor executes further instruction to calculate a slope of an optical axis of an image capturing lens with respect to a reference direction based on the information about the posture of the image capturing apparatus, and to calculate the coefficient based on information about the slope.

12. The image processing apparatus according to claim 11, wherein the at least one processor executes further instruction to, in a case where the optical axis is sloped in a predetermined direction with reference to the reference direction, not calculate the coefficient or calculate a weighted coefficient which is less than the coefficient in a case where the optical axis is sloped in an opposite direction to the predetermined direction with respect to the reference direction.

13. The image processing apparatus according to claim 12, wherein the at least one processor executes further instruction to change a weight used in calculation of the weighted coefficient based on an angle of the slope in the case where the optical axis is sloped in the predetermined direction with respect to the reference direction.

14. The image processing apparatus according to claim 11, wherein the at least one processor executes further instruction to calculate the slope based on information about the image capturing lens of an image capturing apparatus which captures each image and the information about the posture of the image capturing apparatus when the image capturing apparatus captures each image.

15. The image processing apparatus according to claim 11, wherein the reference direction is a horizontal direction.

16. The image processing apparatus according to claim 10, wherein the at least one processor executes further instruction to perform the projective transformation in a case where an optical axis of an image capturing lens of the image capturing apparatus is not orthogonal to a rotation axis when the image is captured while the image capturing direction is sequentially changed to rotate on the rotation axis.

17. The image processing apparatus according to claim 10, further comprising a gyro or/and accelerator configured to detect the posture of the image capturing apparatus during the capturing of the image.

18. An image processing apparatus, comprising:
at least one memory configured to store instructions; and
at least one processor connected to the at least one memory and configured to execute the instructions to:
calculate an amount of movement along an image capturing direction where neighboring images captured adjoin while the image capturing direction is sequentially changed;
calculate a coefficient for tilt correction with respective to each image based on information about a posture of an image capturing apparatus when the image is captured;
perform the transformation on each image using the coefficient calculated based on the information about the posture to correct a tilt that occurs in each image;
perform alignment, based on the amount of movement, along the image capturing direction after the transformation to correct the tilt is performed; and
combine the images on which the alignment has been performed by joining the images together in an order in which the image capturing direction is changed.

19. A control method for an image processing apparatus, comprising:
calculating, based on an amount of movement along an image capturing direction where neighboring images captured adjoin while the image capturing direction is sequentially changed and a coefficient of a projective transformation with respect to each image based on information about a posture of the image capturing apparatus when the image is captured;

performing the projective transformation on each image using the coefficient calculated based on the information about the posture to correct a trapezoidal distortion that occurs in each image;

performing alignment, based on the amount of movement, along the image capturing direction after the projective transformation is performed; and combining the images on which the alignment has been performed by joining the images together in an order in which the image capturing direction is changed.

20. A control method for an image processing apparatus, comprising:

calculating, based on an amount of movement along an image capturing direction where neighboring images captured adjoin while the image capturing direction is sequentially changed and a coefficient of a geometric transformation for projecting each image onto a virtual truncated cone based on information about a posture of the image capturing apparatus when the image is captured;

performing the geometric transformation using the coefficient to project each image onto the virtual truncated cone;

performing alignment, based on the amount of movement, along the image capturing direction after the geometric transformation is performed; and combining the images on which the alignment has been performed by joining the images together in an order in which the image capturing direction is changed.

21. A control method for an image processing apparatus, comprising:

calculating a coefficient for tilt correction with respect to each image, based on an amount of movement along an image capturing direction where neighboring images captured adjoin while the image capturing direction is sequentially changed and information about a posture of the image capturing apparatus when the image is captured;

performing a transformation on each image using the coefficient calculated based on the information about the posture to correct a tilt that occurs in each image;

performing alignment, based on the amount of movement, along the image capturing direction after the transformation to correct the tilt is performed; and combining the images on which the alignment has been performed by joining the images together in an order in which the image capturing direction is changed.

* * * * *